(12) United States Patent
Ueyama

(10) Patent No.: US 6,348,749 B1
(45) Date of Patent: *Feb. 19, 2002

(54) MAGNETIC BEARING DEVICE AND METHOD OF STARTING THE DEVICE

(75) Inventor: Hirochika Ueyama, Hirakata (JP)

(73) Assignee: Koyo Seiko Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,280

(22) Filed: Apr. 14, 1997

(51) Int. Cl.[7] .................................................. H02K 7/09
(52) U.S. Cl. ..................................................... 310/90.5
(58) Field of Search ......................................... 310/90.5

(56) References Cited

U.S. PATENT DOCUMENTS

| | | | | |
|---|---|---|---|---|
| 4,435,771 A | * | 3/1984 | Nozawa et al. | 364/474 |
| 4,540,262 A | * | 9/1985 | Nakai et al. | 396/147 |
| 4,583,031 A | * | 4/1986 | Brunet et al. | 310/90.5 |
| 4,884,329 A | * | 12/1989 | Higuchi | 29/407 |
| 4,956,945 A | * | 9/1990 | Ooshima | 51/165.93 |
| 5,027,280 A | * | 6/1991 | Ando et al. | 310/90.5 |
| 5,130,589 A | * | 7/1992 | Kanemitsu | 310/90.5 |
| 5,347,190 A | * | 9/1994 | Lewis et al. | 310/90.5 |
| 5,486,729 A | * | 1/1996 | Matsushita et al. | 310/90.5 |
| 5,491,396 A | * | 2/1996 | Takahashi et al. | 310/90.5 |
| 5,627,421 A | * | 5/1997 | Miller et al. | 310/90.5 |

FOREIGN PATENT DOCUMENTS

| | | | |
|---|---|---|---|
| EP | 0156730 | 10/1985 | |
| JP | 1-195994 | * 8/1989 | 310/90.5 |

* cited by examiner

*Primary Examiner*—Karl Tamai
(74) *Attorney, Agent, or Firm*—Jacobson Holman, PLLC

(57) ABSTRACT

A magnetic bearing device comprising a magnetic bearing main body having at least electromagnets for magnetically levitating a rotary body and position sensors for detecting the position of the rotary body, and a controller connected to the main body by a cable for controlling the electromagnets based on output signals of the position sensors. The magnetic bearing main body is provided with memory means having stored therein characteristics of the rotary body and the electromagnets.

15 Claims, 3 Drawing Sheets

MAGNETIC BEARING DEVICE AND METHOD OF STARTING THE DEVICE

BACKGROUND OF THE INVENTION

The present invention relates to magnetic bearing devices comprising a plurality of magnetic bearings for contactlessly supporting a rotary body axially and radially thereof, and a method of starting the device.

Already known as such magnetic bearing devices are those comprising a magnetic bearing main body and a controller connected to the main body by a cable. The main body includes a plurality of magnetic bearings for magnetically levitating the rotary body, a plurality of position sensors for detecting the position of the rotary body with respect to the axial and radial directions, and a plurality of protective bearings for limiting the movable range of the rotary body. Each of the magnetic bearings comprises one or two pairs of opposed electromagnets arranged on opposite sides of an axial or radial control axis. The protective bearings restrict the movable range of the rotary body with respect to the axial and radial directions and mechanically support the rotary body when the magnetic bearings produce no magnetic levitation force. The controller controls the electromagnets of the magnetic bearings according to the output signals of the position sensors.

With such magnetic bearing devices, variations occur in mechanical accuracy and in physical characteristics. The variations in mechanical accuracy are attributable to mechanical errors involved in the manufacturing or assembling process. Predominant among the mechanical errors is the difference between the position of the center of the rotary body relative to the electromagnets (magnetic center position) and the position of the center of the rotary body relative to the protective bearings (mechanical center position). Although the magnetic bearing device is so designed that the magnetic center position matches the mechanical center position, an error will occur in these positions relative to each other owing to manufacturing or assembling errors. Furthermore, manufacturing or assembling errors are likely to result in variations in physical characteristics such as the characteristic frequency of the rotary body and unbalance.

In operating the magnetic bearing device, it is desired that the rotary body be held in the magnetic center position because if the-rotary body is magnetically out of alignment, a linear relationship will not be established between the exciting current supplied to the pair of electromagnets of the magnetic bearing and the force of magnetic attraction produced by the pair of electromagnets to entail unstable control. Conventionally, therefore, it is practice to adjust the controller at the installation site of the magnetic bearing device by magnetically levitating the rotary body so as to hold the levitated rotary body in the magnetic center position. It is relatively easy to hold the rotary body in the mechanical center position, whereas in order to hold the rotary body in the magnetic center position, the error in the magnetic center position relative to the mechanical center position must be eliminated by adjusting the controller. The control parameters of the controller need also to be adjusted and are therefore adjusted at the same time in order to correct the characteristic frequency and unbalance of the rotary body.

Since the mechanical accuracy and physical characteristics of the magnetic bearing device differ from device to device, the adjustment of the controller is required for all magnetic bearing devices. The adjustment of the controller moreover requires special knowledge and a cumbersome procedure, which must be performed at the installation site of the user by the special technician of the manufacturer. The device therefore has the problem that the adjustment of the controller is time-consuming and costly.

To simplify the adjustment of the controller, it appears feasible to render the controller less sophisticated in performance, with some variations in mechanical accuracy and physical characteristics taken into consideration, whereas the magnetic bearing device will then become less efficient in performance to an undesirable extent.

SUMMARY OF THE INVENTION

An object of the present invention is to overcome the foregoing problems and to provide a magnetic bearing device and a method of starting the device, the device having a controller which is made easy to adjust for correcting variations in mechanical accuracy and physical characteristics without impairing the performance of the device to an undesirable extent.

The present invention provides a magnetic bearing device comprising a magnetic bearing main body having at least electromagnets for magnetically levitating a rotary body and position sensors for detecting the position of the rotary body, and a controller connected to the main body by a cable for controlling the electromagnets based on output signals of the position sensors, the device being characterized in that the magnetic bearing main body is provided with memory means having stored therein characteristics of the rotary body and the electromagnets.

Since the magnetic bearing main body is provided with the memory means having stored therein various characteristics of the rotary body and the electromagnets, the mechanical accuracy and physical characteristics of the bearing device can be recognized by reading the information in the memory means with the controller when the controller is connected to the magnetic bearing main body. The controller is then adjustable by a simple procedure with reference to the information, so that there is no need to perform a cumbersome adjusting procedure by levitating the rotary body at the site of installation. Even the user having no special knowledge can therefore adjust the controller. This makes it no longer necessary for the manufacturer to dispatch the special technician for the adjustment, consequently reducing the adjusting time and expense. Moreover, it is unlikely that the overall performance of the magnetic bearing device will become impaired more than is necessary since each device is adjustable based on the characteristics thereof.

Preferably, the controller is provided with read means for reading information from the memory means of the magnetic bearing main body, and means for setting control parameters based on the information.

The controller is then adjustable automatically and more easily.

The present invention provides a method of starting a magnetic bearing device comprising a magnetic bearing main body having at least electromagnets for magnetically levitating a rotary body and position sensors for detecting the position of the rotary body, and a controller connected to the main body by a cable for controlling the electromagnets based on output signals of the position sensors, the magnetic bearing main body being provided with memory means having stored therein characteristics of the rotary body and the electromagnets, the controller being provided with read means for reading information from the memory means of the main body, and means for setting control parameters based on the information, the method being characterized by reading the information from the memory means of the main body with the read means of the controller, and setting control parameters by the setting means of the controller based on the information to start the magnetic bearing device.

For starting the device, the controller is adjustable automatically with extreme ease by the method of the invention.

DESCRIPTION OF THE PREFERRED EMBODIMENT

An embodiment of the invention will be described below with reference to the drawings.

Figure 1:
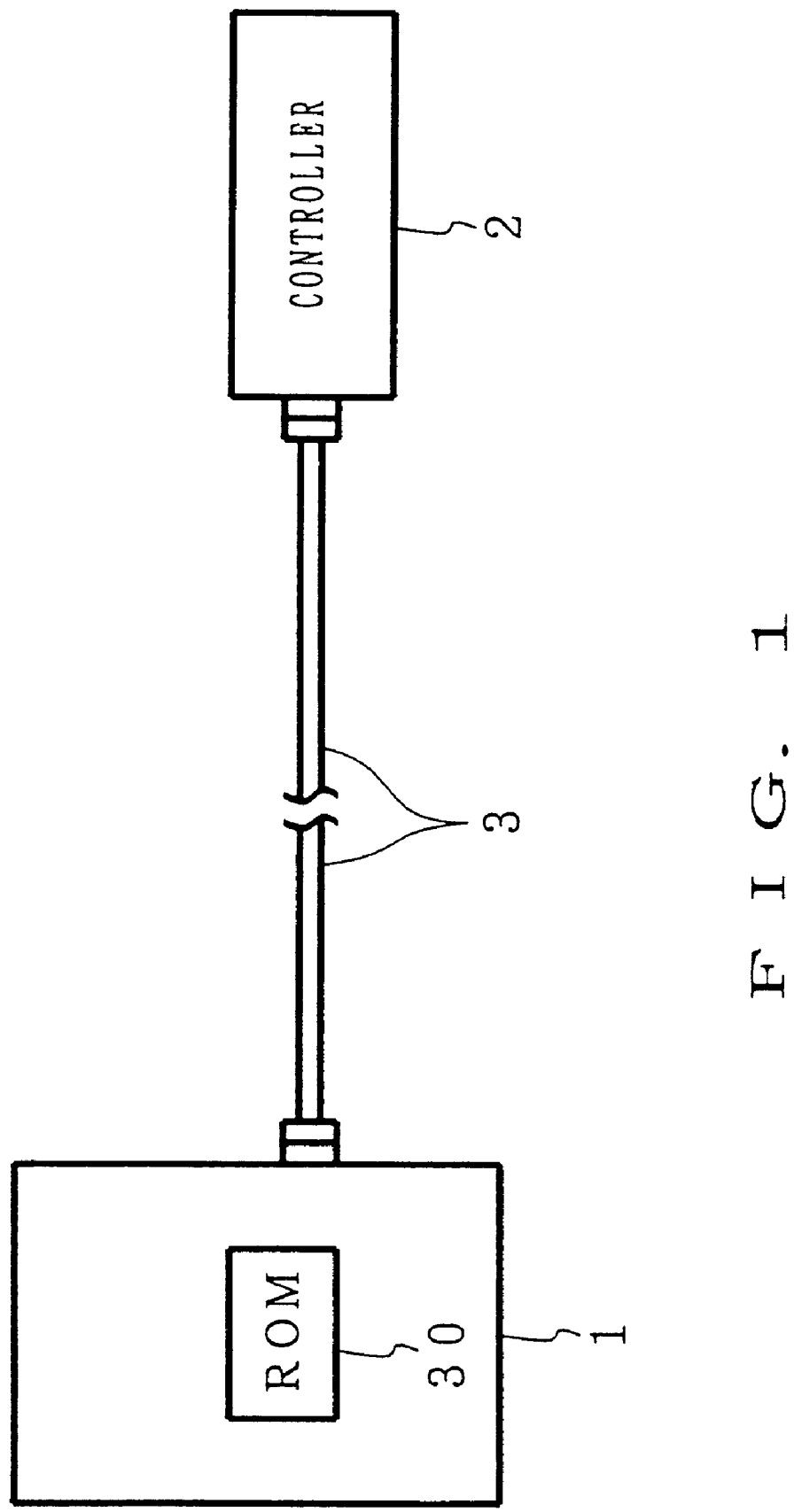
FIG. 1 is a diagram showing the entire construction of a magnetic bearing device embodying the invention.
Figure 2:
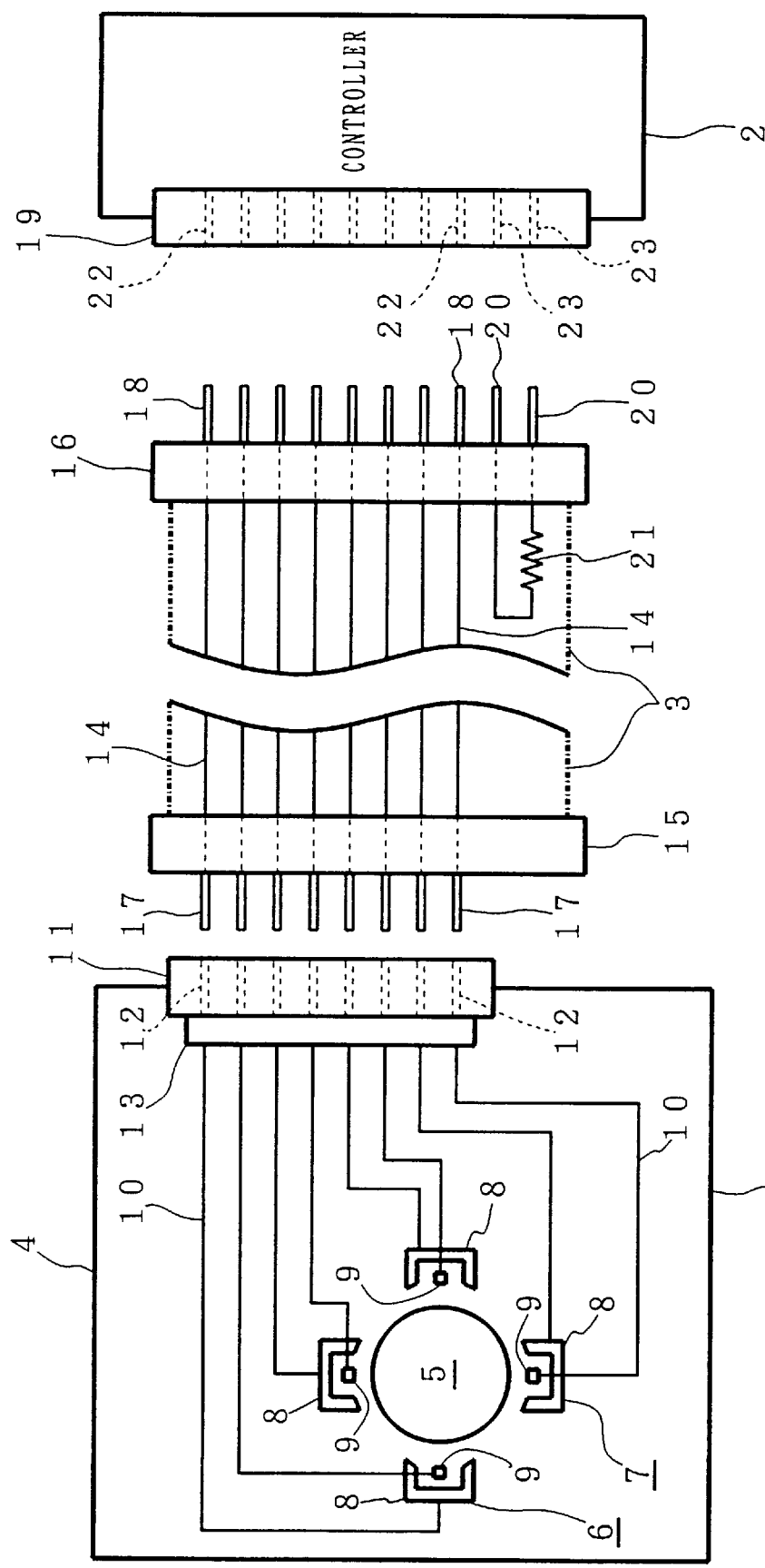
FIG. 2 is a diagram of the entire device of FIG. 1 showing the main components of a magnetic bearing main body and a cable in greater detail.

FIGS. 1 and 2 each schematically show the overall construction of a magnetic bearing device.

The device comprises a magnetic bearing main body 1, a controller 2 therefor and a cable 3 for interconnecting these components.

Although not shown in detail, the magnetic bearing main body 1, which is adapted to magnetically levitate a rotary body 5 within a casing 4, comprises an axial magnetic bearing and two radial magnetic bearings for magnetically levitating the rotary body 5, an axial position sensor unit for detecting the axial position of the rotary body 5, two radial position sensor units for detecting the radial position of the rotary body 5, a high-frequency motor for rotating the rotary body 5 at a high speed, and a plurality of protective bearings for limiting the movable range of the rotary body 5. Of these bearings and units, one radial magnetic bearing 6 and one radial position sensor unit 7 are shown in FIG. 2.

The radial magnetic bearing 6 comprises two pairs of electromagnets 8 arranged at opposite sides of the rotary body 5 in two respective radial control axis directions orthogonal to each other as if the magnets 8 in each pair hold the rotary body from opposite sides. Each pair of electromagnets 8 attract the rotary body 5 from opposite sides of the radial control axis direction to magnetically levitate the rotary body. The axial magnetic bearing comprises a pair of electromagnets arranged at opposite sides of a flange of the rotary body 5 as if holding the flange from opposite sides in an axial control axis direction, whereby the rotary body 5 is attracted from opposite sides in the axial control axis direction for magnetic levitation. The radial position sensor unit 7 comprises two pairs of radial position sensors 9 arranged in the vicinity of the magnets 8 at opposite sides of the rotary body 5 in the two respective radial control axis directions as if the sensors 9 in each pair hold the rotary body from opposite side. Based on the difference between the output signals of the position sensors 9 in each pair, the position (displacement) of the rotary body 5 in the radial control axis direction concerned is determined. The axial position sensor unit comprises a single axial position sensor disposed as opposed to an end face of suitable portion of the rotary body 5. The position (displacement) of the rotary body in the axial control axis direction is determined based on the output signal of this position sensor. A detailed description will not be given of the axial magnetic bearing, radial magnetic bearing 6, axial position sensor unit, radial position sensor unit 7, high-frequency motor and protective bearing since these components are known.

The main body 1 is provided with memory means having stored therein characteristics of the rotary body 5 and the electromagnets 8, i.e. a ROM 30. The ROM 30 is mounted on a suitable portion, for example, of the casing 4. These characteristics include mechanical accuracy such as the error (center position error) of the magnetic center position of the rotary body 5 relative to the mechanical center position thereof, and physical characteristics of the rotary body 5 such as the characteristic frequency and unbalance. Stored in connection with the center position error are the values of errors in the axial control axis direction and in the two radial control axis directions orthogonal to each other. As to the characteristic frequency of the rotary body 5, the relationship between the number of revolutions of the rotary body 5 and the bending moment thereof is stored to indicate how the bending moment varies with the number of revolutions. As to the unbalance of the rotary body 5, the relationship between the number of revolutions of the rotary body 5 and the unbalance is stored to show how the mode of unbalance varies with the number of revolutions. These characteristics are determined by suitable methods by magnetically levitating the rotary body 5 using an appropriate controller when the magnetic bearing main body 1 is produced by the manufacturer, and are stored in the ROM 30. The center position error is determined, for example, in the following manner. First, the pair of electromagnets in each control axis direction are driven, one at a time, to move the rotary body 5 to opposite limit positions in the control axis direction, and the mechanical center position with respect to the control axis direction is determined from the output signals of the position sensors in the same control axis direction at the respective limit positions. The limit position of the rotary body 5 is the position where the rotary body 5 is brought to a halt by contact with the protective bearing when only one of the electromagnets in the control axis direction is driven to attract the rotary body 5 in the direction. The average of the two limit positions in each control axis direction gives the mechanical center position in the direction. Next, the rotary body is temporarily levitated at the mechanical center to determine the magnetic center position from the exciting current flowing through the electromagnets of each magnetic bearing during the levitation. A center position error is then determined from the magnetic center position and the mechanical center position. The ROM 30 may have stored therein the minimum essential characteristics required of the magnetic bearing device. In addition to the mechanical accuracy and physical characteristics, the production number of the magnetic bearing main body 1, etc. may be stored in the ROM 30.

The electromagnets 8 and the position sensors 9 are connected by electric wires 10 to corresponding contacts 12 of a connector 11 secured to the casing 4. The metal parts of these connections are covered with rubber or like insulator 13. Although not shown, the ROM 30, and the unillustrated axial magnetic bearing, radial magnetic bearing, axial position sensor unit, radial position sensor unit and high-frequency motor are also connected by electric wires to the connector or to separate connectors.

The cable 3 comprises a plurality of electric wires 14 corresponding to the respective wires 10 of the magnetic bearing main body 1 and connected, each at its opposite ends, to corresponding contacts 17, 18 of connectors 15, 16.

The connector 15 of the cable 3 is connected to the connector 11 of the main body 1, and the other connector 16 thereof to a connector 19 of the controller 2. The connector 16 of the cable 3 adjacent the controller 2 has two identification contacts 20 in addition to the contacts 18 for the wires. A resistor 21 connected between these contacts 20 provides electrical identification means for discriminating the length of the cable 3. The resistance of the resistor 21 is altered with the length of the cable 3. For example, the resistance is 10 kΩ, 20 kΩ, 30 kΩ or 40 kΩ when the length of the cable 3 is 5 m, 10 m, 15 m or 20 m, respectively.

The connector 19 on the controller 2 has two identification contacts 23 corresponding to the identification contacts 20 in addition to wire contacts 22 corresponding to the wire contacts 18 of the connector 16 of the cable 3.

Although not shown, the controller 2 has a voltage amplifier for amplifying the outputs signals of the position sensors, a power amplifier for driving the electromagnets and a computer for controlling the device in its entirety.

The controller 2 detects the position of the rotary body 5 with respect to the axial control axis direction and the radial control axis directions from the outputs signals from the axial position sensor unit and the radial position sensor units 7 and controls the axial magnetic bearing and the electromagnets 8 of the radial magnetic bearings 6, whereby the rotary body 5 is magnetically levitated at a predetermined position. The controller 2 further controls the high-frequency motor to rotate the motor at a predetermined speed. Such operation of the controller 2 is known and therefore will not be described in detail.

The controller 2 has stored therein constants for a plurality of sets of control corresponding respectively to different lengths of cables 3. These constants include, for example, the gain and quantity of offset of the voltage amplifier for compensating for the attenuation and offset of the output voltage of the position sensor 9. The controller 2 has further stored therein data for setting optimum control parameters for the characteristic frequency and unbalance of the rotary body 5.

When starting the magnetic bearing device, the controller 2 detects the resistance of the resistor 21 of the cable 3 to discriminate the length of the cable 3, and automatically selects and sets corresponding constants, e.g., a gain and quantity of offset. The controller further reads data as to the mechanical accuracy and physical properties of the magnetic bearing main body 1 from the ROM 30, and based on the data, the controller automatically adjusts itself for holding the rotary body 5 at the magnetic center position and automatically sets control parameters in accordance with the characteristic frequency and unbalance of the rotary body 5. More specifically stated, the controller determines the magnetic center position based on the center position errors read from the ROM 30, and automatically sets a control target position with respect to each control axis direction so that the magnetic center position matches the control target position (neutral position) of the rotary body 5. Also automatically set are optimum control parameters required for the characteristic frequency and unbalance of the rotary 5 read from the ROM 30. The magnetic bearing main body 1 is thereafter controlled using the constants, control target positions and control parameters thus set.

With the magnetic bearing device described, there may arise a need to alter the length of the cable 3, for example, in the case where the site of installation of the magnetic bearing main body 1 or controller 2 is changed. Further when the controller 2 is connected to the magnetic bearing main body 1 by the cable 3, the presence of the cable 3 results in attenuation (attenuation of amplitude) of the output voltage of the position sensor and offset thereof (offset of voltage value at the center of amplitude), so that these results need to be compensated for on the controller 2. The attenuation of the output voltage is compensated for by adjusting the gain of the voltage amplifier of the controller 2, and the offset by offsetting the output voltage in the reverse direction on the controller 2. The gain and quantity of offset of the voltage amplifier included in the constants for control. The quantity of attenuation and quantity of offset of the position sensor output voltage vary with the length of the cable 3 and increase as the cable length increases. For this reason, it is necessary to set the gain and offset quantity of the voltage amplifier in the controller 3 according to the length of the cable 3, whereas since the length of the cable 3 is conventionally not detectable when it is merely connected, it has been difficult to set these constants. For example, it appears feasible to measure the quantity of attenuation and quantity of offset of the actual output voltage when the cable 3 is connected and to set constants based on the measurements, but the setting procedure is then very cumbersome. It also appears possible to predetermine the relationship between the length of cables 3 and the constants, recognize the length of a particular cable 3 as by measuring when it is connected and set constants based on the result, whereas this procedure is still cumbersome. Moreover such a cumbersome procedure must be performed every time a cable 3 of different length is used, hence inconvenience.

With the magnetic bearing device described, however, the resistor 21 provided in the cable 3 enables the controller 2 to automatically discriminate the length of the cable 3 as connected and automatically set control constants in accordance with the length. This obviates the need for the cumbersome constant setting procedure when the cable 3 is replaced by another.

In the case where the magnetic bearing device is used for a vacuum pump, the interior of the casing 4 of the main body 1 holds a vacuum. If the metal parts of connections between the wires 10 and the connector 11 are left exposed, vacuum discharge is likely to occur between the exposed parts. In the event of vacuum discharge occurring across the wires for the motor, the inverter for driving the motor will be damaged. With the device described, however, the metal parts of the connections are all covered with the insulator 13 and therefore prevented from vacuum discharge, whereby the inverter is protected from damage.

Figure 3:
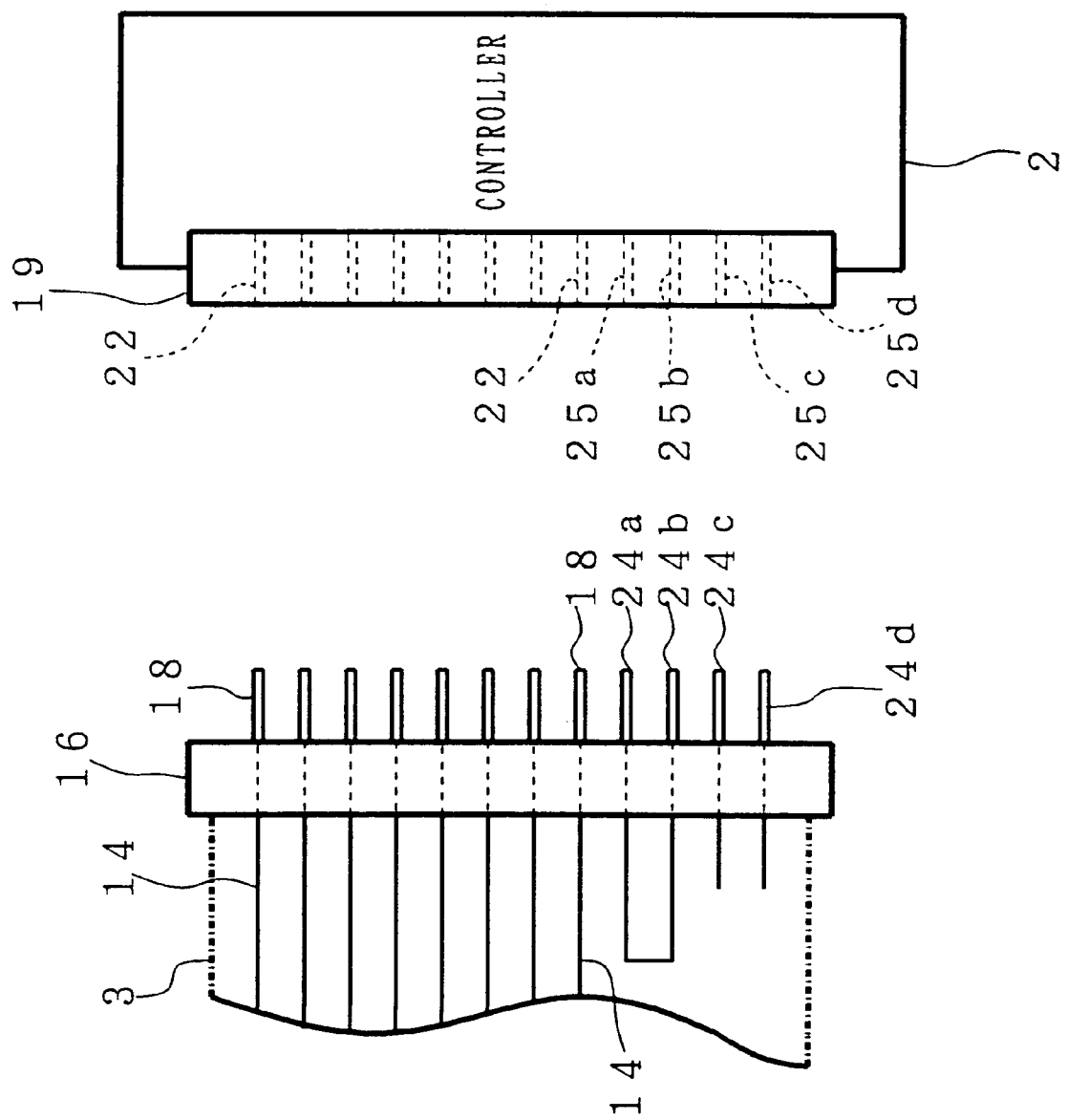
FIG. 3 is a diagram showing the main components of modified electrical identification means.

FIG. 3 shows a modification of electrical identification means for the cable 3.

In this case, a cable connector 16 adjacent to the controller 2 has four identification contacts 24a, 24b, 24c, 24d in addition to the wire contacts 18. These contacts will be designated collectively by the reference numeral 24 and individually termed the first contact 24a, second contact 24b, third contact 24c and fourth contact 24d when there arises a need for distinction. Depending on the length of the cable 3, the first contact 24a is connected to the contact 24b, 24c or 24d or to none of the other contacts for short-circuiting. The first contact 24a is connected to the second contact 24b when the cable 3 has a length of 5 m, to the third contact 24c for a length of 10 m, to the fourth contact 24d for a length of 15 m, or to none of the contacts 24b, 24c, 24d for a length of 20 m. A connector 19 on the controller 2 has, in addition to the wire contacts 22, four identification contacts 25a, 25b, 25c, 25d corresponding to the respective identification contacts 24 of the cable connector 16. The controller 2 detects the resistance between the first contact 24a and the other contact 24b, 24c or 24d to discriminate the short-circuit pattern and thereby detect the length of the cable 3. The illustrated arrangement has the same construction as the foregoing embodiment with the exception of the above feature. Throughout the drawings, like parts are designated by like reference numerals.

What is claimed is:

1. A magnetic bearing device comprising:
   a magnetic bearing main body having at least electromagnets for magnetically levitating a rotary body and position sensors for detecting the position of the rotary body and producing output signals;
   a cable;
   a single controller connectable to the main body by the cable for controlling the electromagnets;
   characteristics-storing memory means built in the magnetic bearing main body for storing therein characteristics of the rotary body and the electromagnets with which the main body is equipped, the characteristics being determined and stored in advance and including at least one of center position error of the magnetic center position of the rotary body relative to the mechanical center position thereof, frequency of the rotary body and variation of unbalance of the rotary body with the number of revolutions of the rotary body;
   reading means provided in the single controller for reading information from the characteristics-storing memory means when starting the magnetic bearing device; and
   control parameter setting means provided in the single controller for setting control parameters for the main body automatically based on the information when starting the magnetic bearing device;
   wherein the single controller controls the magnetic bearing based on the output signals of the position sensors and the information set by the control parameter setting means.

2. A method for starting a magnetic bearing device comprising a magnetic bearing main body having at least electromagnets for magnetically levitating a rotary body and position sensors for detecting the position of the rotary body and producing output signals, a cable, a single controller connectable to the main body by the cable for controlling the electromagnets based on the output signals of the position sensors, characteristics-storing memory means built in the magnetic bearing main body for storing therein characteristics of the rotary body and the electromagnets with which the main body is equipped, the characteristics being determined and stored in advance and including at least one of center position error of the magnetic center position of the rotary body relative to the mechanical center position thereof, frequency of the rotary body and variation of unbalance of the rotary body with the number of revolutions of the rotary body, reading means provided in the single controller for reading information from the characteristics-storing memory means when starting the magnetic bearing device, and control parameter setting means provided in the single controller for setting control parameters for the main body automatically based on the information when starting the magnetic bearing device, the method comprising the steps of:

(a) reading the information from the characteristics-storing memory means of the main body with the reading means when starting the magnetic bearing device;
   (b) setting the control parameters for the main body with the control parameter setting means based on the information from the characteristics-storing memory means of the main body and the starting of the magnetic bearing device; and
   (c) controlling the magnetic bearing by using the control parameters.

3. The magnetic bearing device of claim 1, wherein a center position error in an axial control axis direction and in two radial control axis directions orthogonal to each other is included in the center position errors in the information stored in the characteristics-storing memory means.

4. The magnetic bearing device of claim 2, wherein a center position error in an axial control axis direction and in two radial control axis directions orthogonal to each other is included in the center position errors in the information stored in the characteristics-storing memory means.

5. A magnetic bearing device comprising:
   a magnetic bearing main body having at least electromagnets for magnetically levitating a rotary body and position sensors for detecting the position of the rotary body and producing output signals;
   a cable;
   a single controller connectable to the main body by the cable for controlling the electromagnets based on the output signals of the position sensors;
   characteristics-storing memory means provided in the magnetic bearing main body for storing therein characteristics of the rotary body and the electromagnets with which the main body is equipped, the characteristics being determined and stored in advance including at least one of center position error of the magnetic center position of the rotary body relative to the mechanical center position thereof, frequency of the rotary body and variation of unbalance of the rotary body with the number of revolutions of the rotary body;
   reading means provided in the single controller for reading information from the characteristics-storing memory means when the main body is connected to the single controller;
   control parameter setting means provided in the single controller for setting control parameters for the main body based on the information;
   wherein a relationship between the number of revolutions of the rotary body and a bending moment thereof is included in the frequency of the rotary body in the information stored in the characteristics-storing memory means; and
   wherein the single controller controls, the magnetic bearing based in the output signals of the position sensors and the information set by the control parameter setting means.

6. A method for starting a magnetic bearing device comprising a magnetic bearing main body having at least electromagnets for magnetically levitating a rotary body and position sensors for detecting the position of the rotary body and producing output signals, a cable, a single controller connectable to the main body by the cable for controlling the electromagnets based on the output signals of the position sensors, characteristics-storing memory means provided in the magnetic bearing main body for storing therein characteristics of the rotary body and the electromagnets with which the main body is equipped, the characteristics being determined and stored in advance and including at least one of center position error of the magnetic center position of the rotary body relative to the mechanical center position thereof, frequency of the rotary body and variation of unbalance of the rotary body with the number of revolutions of the rotary body, reading means provided in the single controller for reading information from the characteristics-storing memory means when the main body is connected to the single controller, and control parameter setting means provided in the single controller for setting control parameters for the main body based on the information, the method comprising the steps of:

(a) reading the information from the characteristics-storing memory means of the main body with the reading means when the main body is connected to the single controller;

(b) setting the control parameters for the main body with the control parameter setting means based on the information from the characteristics-storing memory means of the main body and the starting of the magnetic bearing device;

wherein a relationship between the number of revolutions of the rotary body and a bending moment thereof is included in the frequency of the rotary body in the information stored in the characteristics-storing memory means; and (c) controlling the magnetic bearing by using the control parameters.

7. The magnetic bearing device of claim 1, wherein the cable comprises electrical identification means for discriminating the length of the cable.

8. The magnetic bearing device of claim 7, wherein the cable has two identification contacts connected to the single controller and the electrical identification means comprises a resistor connected in between the two identification contacts and having a resistance corresponding to length of cables.

9. The magnetic bearing device of claim 7, wherein the single controller comprises:

constants-storing memory means for storing a plurality of sets of constants for control corresponding respectively to different lengths of cables; and constants setting means for discriminating the length of cables based on the information from the electrical identification means and selecting and setting the constants for control corresponding to the lengths of cables from the constants-storing memory means.

10. The magnetic bearing device of claim 8, wherein the single controller comprises:

constants-storing memory means for storing a plurality of sets of constants for control corresponding respectively to different lengths of cables; and constants setting means for discriminating the length of cables based on the information from the electrical identification means and selecting and setting the constants for control corresponding to the lengths of cables from the constants-storing memory means.

11. The magnetic bearing device of claim 10, wherein constants for control include a gain and quantity of offset of a voltage amplifier for compensating for attenuation and offset of the output signals of the position sensor.

12. A method for starting a magnetic bearing device comprising:

a magnetic bearing main body having at lest electromagnets for magnetically levitating a rotary body and position sensors for detecting the position of the rotary body and producing output signals;

a cable comprising electrical identification means for discriminating the length of cable;

characteristics-storing memory means provided in the magnetic bearing main body for storing therein characteristics of the rotary body and the electromagnets with which the main body is equipped, the characteristics including at least one of center position error of the magnetic center position of the rotary body relative to the mechanical center position thereof, frequency of the rotary body and variation of unbalance of the rotary body with the number of revolutions of the rotary body;

a single controller connectable to the main body by the cable for controlling the electromagnets based on the output signals of the position sensors, the single controller comprising:

constants-storing memory means for storing a plurality of sets of constants for control corresponding respectively to different lengths of cables; and constants setting means for discriminating the length of cables based on the information from the electrical identification means and selecting and setting the constants for control corresponding to the lengths of cables from the constants-storing memory means;

reading means provided in the single controller for reading information from the characteristics-storing memory means when the main body is connected to the single controller; and control parameter setting means provided in the single controller for setting control parameters for the main body based on the information, the method comprising the steps of:

(a) reading the information from the characteristics-storing memory means of the main body with the reading means and discriminating the length of the cable based on the information with the electrical identification means when the main body is connected to the single controller; and (b) setting the control parameters for the main body with the control parameter setting means based on the information from the characteristics-storing memory means of the main body, selecting and setting the constants for control corresponding to the lengths of cables from the constants-storing memory means with the constants setting means and the starting of the magnetic bearing device.

13. The method of claim 12, wherein the cable has two identification contacts connected to the single controller and the electrical identification means comprises a resistor connected in between the two identification contacts and having a resistance corresponding to length of cables.

14. The method of claim 12, wherein the constants for control include a gain and quantity of offset of a voltage amplifier for compensating for attenuation and offset of the output signals of the position sensor.

15. The method of claim 13, wherein the constants for control include a gain and quantity of offset of a voltage amplifier for compensating for attenuation and offset of the output signals of the position sensor.

* * * * *